United States Patent Office 3,398,695
Patented Aug. 27, 1968

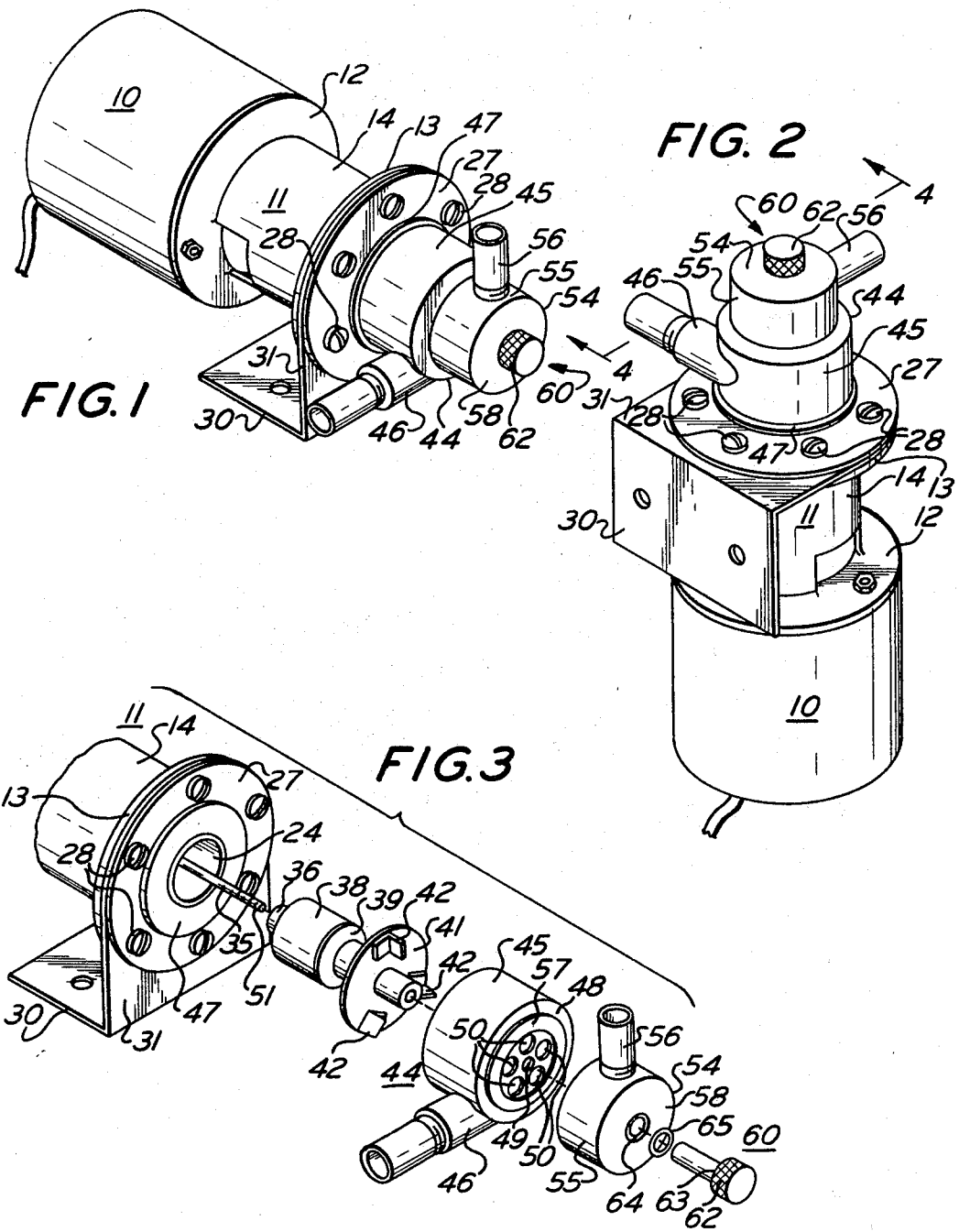

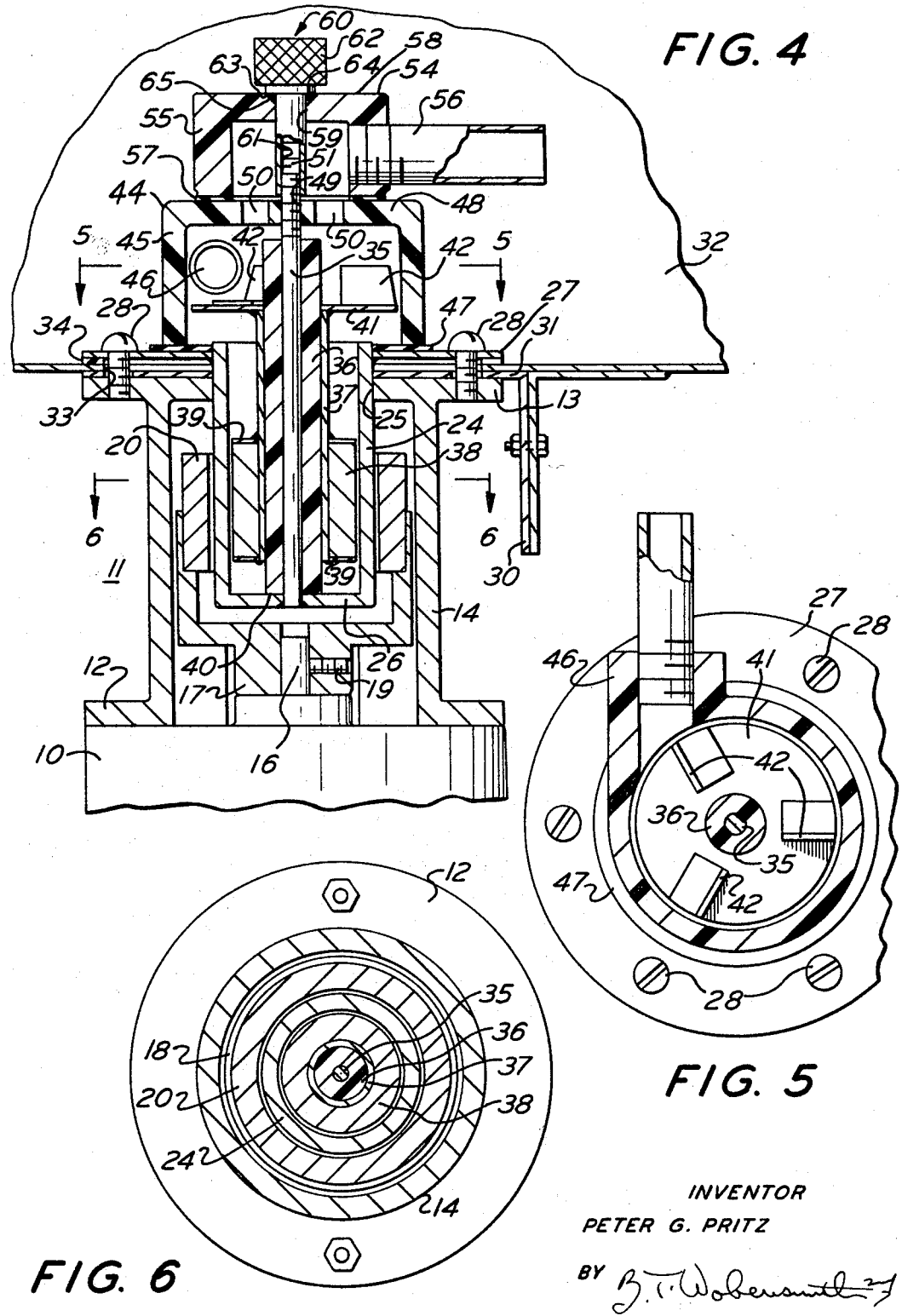

3,398,695
ELECTRIC MOTOR DRIVEN PUMP
Peter G. Pritz, Jenkintown, Pa. (% Trico Non Ferrous Metal Products Inc., Wyandotte Road, Willow Grove, Pa. 19090)
Filed Jan. 24, 1967, Ser. No. 611,328
5 Claims. (Cl. 103—87)

ABSTRACT OF THE DISCLOSURE

An electric motor driven pump with magnetic clutch isolating the motor from the pump, the pump having a rotatably adjustable inlet connection and a rotatably adjustable and removable outlet connection.

Field of the invention

This invention relates to electric motor driven rotary pumps and more particularly to a pump of this type in which a magnetic coupling is interposed between the pump and motor and which has a wide range of adaptability and usefulness.

Description of the prior art

It has heretofore been proposed to provide motor driven pumps of large size having magnetic coupling interposed between the motor and the pump but these have not been adapted for small capacity pumps driven by small fractional horsepower motors. Such prior pumps also were specialized and restricted in their capabilities of use.

Summary of the invention

It is the principal object of the present invention to provide an electric motor driven rotary pump with an interposed magnetic coupling which is simple in construction, can be operated as desired with its shaft vertical, horizontal, or tilted and which has a wide range of adaptability.

It is a further object of the present invention to provide an electric motor driven rotary pump which has a fluid delivery outlet capable of being rotatably shifted to a desired location, for use, and independently of the fluid inlet.

It is a further object of the present invention to provide an electric motor driven rotary pump which has a fluid inlet capable of being rotatably shifted to a desired location for use, and independently of the fluid delivery outlet.

Other objects and advantageous features of the invention will be apparent from the description and claims.

Brief description of the drawing

The nature and characteristic features of the invention will be more readily understood from the following description taken in connection with the acompanying drawings forming part thereof, in which:

FIGURE 1 is a view in perspective of the pump in accordance with the invention in one disposition for use;

FIG. 2 is a view in perspective of the pump in accordance with the invention in another disposition for use;

FIG. 3 is an exploded perspective view of the principal portions fo the invention;

FIG. 4 is a vertical sectional view, enlarged, taken approximately on the line 4—4 of FIG. 2;

FIG. 5 is a transverse sectional view taken approximately on the line 5—5 of FIG. 4; and FIG. 6 is a transverse sectional view taken approximately on the line 6—6 of FIG. 4.

It should, of course, be understood that the description and drawings herein are illustrative merely, and that various modifications and changes can be made in the structure disclosed without departing from the spirit of the invention.

Like numerals refer to like parts throughout the several views.

Description of the preferred embodiment

Referring now more particularly to the drawings, in which preferred embodiments of the invention are illustrated an electric motor 10 of any conventional type is provided, preferably of fractional horsepower.

The motor 10 has a coupling housing 11 secured thereto in any desired manner, and includes end walls 12 and 13 and a cylindrical housing 14 therebetween.

The shaft 16 of the motor 10 extends wtihin the coupling housing 11 and has the end extension 17 of an outer coupling element 18 connected thereto such as by a set screw 19. The coupling element 18 is preferably of cup shape and has a cylindrical magnetic sleeve 20 carried thereby. The sleeve 20 is advantageously of ceramic magnetic material with multiple magnetic poles extending longitudinally axially on the inner face of the sleeve 20. A suitable ceramic magnetic material of the barium ferrite type is available under the trademark Ceramagnet from Stackpole Carbon Company, St. Marys, Pa.

An isolating sleeve 24 engaged in an opening 25 in the end wall 14 is provided with an inner end closure 26, preferably integral therewith and an outwardly extending mounting flange 27 secured to the sleeve 24 in fluid tight relation. The sleeve 24 is preferably of nonmagnetic responsive material, such as stainless steel, brass or bronze or synthetic plastic.

The flange 27 can be carried on the end wall 13 and held by screws 28 extending in threaded engagement with the end wall 14.

If the pump is to be employed in a horizontal position, as shown in FIG. 1, or in a different position as shown in FIG. 4, a supporting bracket 30 for the pump can have a mounting plate 31 interposed between the flange 27 and the end wall 14.

If the pump is to be employed vertically disposed and within a tank 32, as in FIG. 4, at a suitable opening 33 in the bottom wall of the tank 32, the mounting flange 27 can be employed to clamp the pump in position with a gasket 34 interposed to prevent a fluid leakage from the tank 32 at this location.

The end closure 26 preferably has rigidly secured thereto and coaxial and concentric with the sleeve 24, a fixed spindle 35.

The spindle 35 has a bearing sleeve 36 rotatably carried thereon, which may be of nylon or other suitable material of low coefficient of friction with respect to the spindle 35. The sleeve 36 has a metallic cover 37, of nonmagnetic responsive material, which carries an inner magnetic coupling sleeve 38 interiorly of and concentric with respect to the magnetic sleeve 20 and the isolating sleeve 24. The sleeve 38 is preferably held in place by spaced rims 39 also of nonmagnetic responsive material.

The sleeve 38 is advantageously of the same ceramic magnetic material as the sleeve 20, with multiple magnetic poles extending longitudinally axially on the outer face of the sleeve 38. The sleeves 20 and 38, if of ceramic magnetic material, are not subject to rusting or like corrosion and are inert physically and electrically to most chemicals and gases while having high coercive force and resistance to demagnetization.

The end face 40 of the bearing sleeve 36 limits movement of the sleeve 36 and the parts carried thereby along the spindle 35 by engagement with the inner end face of the end closure 26.

The cover 37 beyond the isolating sleeve 24 has an impeller disc 41 secured thereto with fluid impeller vanes 42 carried thereon.

A fluid impeller housing 44, of cup shape, is provided having a side wall portion 45 with a fluid delivery connection 46, extending therefrom. A gasket 47 is preferably interposed between the side wall portion 45 and the mounting flange 27.

The impeller housing 44 has an outer end wall portion 48 with a central opening 49 through which the spindle 35 extends.

It will be noted that the impeller housing 44 can be rotated on the axis provided by the spindle 35 to attain any desired position of the fluid delivery connection 46. The outer end wall portion 48 is preferably provided with a plurality of inlet openings 50 close to the spindle 35 for central entry of fluid to the interior of the housing 44 for delivery by the impeller vanes 42 to and through the fluid delivery connection 46.

The construction just described is suitable for use for many purposes such as in the interior of the tank 32, with a clamping nut (not shown) on a threaded end portion 51 of the spindle 35 to hold the housing 44 against displacement.

It is preferred however, for other purposes, to employ a fluid inlet housing 54, of cup shape, having a side wall portion 55 with a fluid inlet connection 56 extending therefrom.

A gasket 57 is preferably interposed between the side wall portion 55 and the exterior of the side wall portion 45. The inlet housing 54 has an end wall portion 58 with a central opening 59 through which the spindle 35 extends. A clamp 60 is preferably provided having a threaded interior 61 for engagement with the threaded end 51, and having a knob 62 for manual turning. The clamp 60 has a shoulder 63 for engagement with the outer face of the end wall portion 58.

If desired, a groove 64 can be provided in the end wall portion 58 with a fluid tight packing 65, such as an O-ring, therein with which the shoulder 63 also engages.

It will be noted that for any specific installation, and to meet the conditions encountered, the fluid impeller housing 54 can be rotated on the axis provided by the spindle 35 and the clamp 60 to any desired position. This positioning is independent of the positioning of the outlet housing 44. The housing 44 can be clamped and held at the selected position.

The housing 44 and 54 can be clamped and held at the desired adjusted position by the clamp 60.

The isolating sleeve 24 provides an effective barrier to escape of fluid from the tank 32 while permitting lubrication of the bearing sleeve 36 on the spindle 35 by the fluid being pumped.

In a horizontal or tilted position of the motor 10 internal lubrication of the bearing sleeve 36 can still be effected.

It will thus be seen that an electric motor driven magnetically coupled pump is provided for attaining the objects of the invention.

I claim:
1. A pump comprising:
   a coupling housing having an end wall,
   an isolating sleeve mounted on said end wall and having a closed end,
   an exterior magnetic coupling element exteriorly disposed with respect to said isolating sleeve,
   means for actuating said exterior coupling element,
   an interior magnetic coupling element rotatably carried within said sleeve and actuated by said exterior coupling element,
   an impeller housing mounted on said end wall for selective orientation,
   said interior coupling element having an impeller connected thereon in driven relation and disposed within said impeller housing, and
   said impeller housing having a fluid inlet housing mounted thereon for selective orientation.
2. A pump as defined in claim 1 in which:
   said isolating sleeve has a fixed concentric spindle extending from the interior at one end of said sleeve, and
   said fluid inlet housing is mounted on said spindle.
3. A pump as defined in claim 1 in which:
   said fluid inlet housing is cup shaped.
4. A pump as defined in claim 2 in which:
   a clamp member is provided for clamping said impeller housing and said fluid inlet housing in selected positions.
5. A pump as defined in claim 1 in which:
   said isolating sleeve has a fixed concentric spindle extending from the interior at one end of said sleeve and beyond said sleeve,
   said interior coupling element is journaled on said spindle,
   said impeller housing is cup shaped and has an outer end wall mounted on said spindle with inlet openings in said end wall communicating with the interior of said impeller housing,
   said fluid inlet housing is of cup shape with an outer end wall mounted on said spindle,
   said housings being rotatable on said spindle to selected positions of orientation, and
   a clamp member on said spindle retaining said housings in selected positions of orientation.

References Cited

UNITED STATES PATENTS

| | | | |
|---|---|---|---|
| 3,001,479 | 9/1961 | Swenson et al. | 103—87 |
| 3,195,467 | 7/1965 | Collet | 103—87 |
| 3,205,827 | 9/1965 | Zimmermann | 103—87 |

ROBERT M. WALKER, *Primary Examiner.*